(12) United States Patent
Keller et al.

(10) Patent No.: US 11,864,091 B2
(45) Date of Patent: Jan. 2, 2024

(54) METHOD, AND NODES, FOR DISCOVERING SERVICES IN A TELECOMMUNICATION NETWORK PROVIDED BY A NETWORK FUNCTION, NF, IN A SERVICE BASED ARCHITECTURE, SBA, BASED TELECOMMUNICATION NETWORK

(71) Applicant: Telefonaktiebolaget LM Ericsson (publ), Stockholm (SE)

(72) Inventors: Ralf Keller, Würselen (DE); David Castellanos Zamora, Madrid (ES); Jose Miguel Dopico Sanjuan, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 404 days.

(21) Appl. No.: 17/286,733

(22) PCT Filed: Dec. 3, 2018

(86) PCT No.: PCT/EP2018/083379
§ 371 (c)(1),
(2) Date: Apr. 19, 2021

(87) PCT Pub. No.: WO2020/083516
PCT Pub. Date: Apr. 30, 2020

(65) Prior Publication Data
US 2021/0385734 A1     Dec. 9, 2021

(30) Foreign Application Priority Data
Oct. 25, 2018  (EP) ..................... 18382757

(51) Int. Cl.
*H04W 48/14*   (2009.01)
*H04W 8/00*    (2009.01)
(Continued)

(52) U.S. Cl.
CPC ............. *H04W 48/16* (2013.01); *H04W 4/50* (2018.02); *H04W 84/042* (2013.01)

(58) Field of Classification Search
CPC ..... H04W 48/16; H04W 4/50; H04W 84/042; H04L 67/51
(Continued)

(56) References Cited

U.S. PATENT DOCUMENTS 7,123,626 B1    10/2006  Feyerabend
11,190,995 B2 * 11/2021  Takakura .............. H04W 48/18
(Continued)

FOREIGN PATENT DOCUMENTS

CN    102487407 A    6/2012
CN    104272707 A    1/2015
(Continued)

OTHER PUBLICATIONS

3rd Generation Partnership Project; Technical Specification Group Services and System Aspects; security; Lawful Interception (LI) Architecture and Functions (Release 15), France (Year: 2018).*
(Continued)

*Primary Examiner* — Tanmay K Shah
(74) *Attorney, Agent, or Firm* — ROTHWELL, FIGG, ERNST & MANBECK, P.C.

(57) ABSTRACT

A method for discovering services in a telecommunication network provided by a network function, NF, in a Service Based Architecture, SBA, based telecommunication network, said method comprising the steps of receiving a discovery request, from a Network function, NF, consumer, for discovering an NF producer to interact with, wherein said discovery request comprises a Mobile Station International Subscriber Directory Number, MSISDN, associated with said NF consumer, transmitting to an address translate server, an address translate query, wherein said address
(Continued)

translate query comprises said MSISDN, receiving an address translate response, wherein said address translate response comprises a Universal Resource Identifier, URI, and transmitting, to said NF, a discovery response, wherein said discovery response comprises an NF producer instance for interaction with said NF.

12 Claims, 4 Drawing Sheets

(51) Int. Cl.
  *H04W 48/16* (2009.01)
  *H04W 4/50* (2018.01)
  *H04W 84/04* (2009.01)
(58) Field of Classification Search
  USPC .......................................................... 455/434
  See application file for complete search history.

(56) References Cited

U.S. PATENT DOCUMENTS

| 11,689,669 | B2* | 6/2023 | Saker | ...................... H04L 12/14 |
| | | | | 455/406 |
| 2011/0222532 | A1 | 9/2011 | Noldus | |

FOREIGN PATENT DOCUMENTS

| CN | 104303527 A | 1/2015 |
| EP | 1988698 A1 | 11/2008 |

OTHER PUBLICATIONS

International Search Report and the Written Opinion of the International Searching Authority, issued in corresponding International Application No. PCT/EP2018/083379, dated Jun. 4, 2019, 11 pages.
International Preliminary Report on Patentability, issued in corresponding International Application No. PCT/EP2018/083379, dated Jan. 26, 2021, 16 pages.
3GPP "3rd Generation Partnership Project; Technical Specification Group Services and System Aspects; Security; Lawful Interception (LI) Architecture and Functions (Release 15)" 3GPP DTS 33.127 V0.0.7 (Oct. 2018), 50 pages.
Huawei "Parameters for AMF, AUSF, UDM and UDR Selection" 3GPP TSG CT WG4 Meeting #85, C4-184057, Osaka, Japan, May 21-25, 2018, 26 pages.
3GPP "3rd Generation Partnership Project; Technical Specification Group Core Network and Terminals; Numbering, addressing and identification (Release 15)" 3GPP TS 23.003 V15.5.0 (Sep. 2018), 128 pages.
3GPP "3rd Generation Partnership Project; Technical Specification Group Core Network and Terminals; Technical realization of the Short Message Service (SMS) (Release 15)" 3GPP TS 23.040 V15.2.0 (Sep. 2018), 216 pages.
3GPP "3rd Generation Partnership Project; Technical Specification Group Services and System Aspects; Support of Short Message Service (SMS) over generic 3GPP Internet Protocol (IP) access; Stage 2 (Release 15)" 3GPP TS 23.204 V15.0.0 (Mar. 2018), 59 pages.
3GPP "3rd Generation Partnership Project; Technical Specification Group Services and System Aspects; System Architecture for the 5G System; Stage 2 (Release 15)" 3GPP TS 23.501 V15.3.0 (Sep. 2018), 226 pages.
3GPP "3rd Generation Partnership Project; Technical Specification Group Services and System Aspects; Procedures for the 5G System; Stage 2 (Release 15)" 3GPP TS 23.502 V15.3.0 (Sep. 2018), 330 pages.
3GPP "3rd Generation Partnership Project; Technical Specification Group Core Network and Terminals; Diameter based protocols to support Short Message Service (SMS) capable Mobile Management Entities (MMEs) (Release 15)" 3GPP TS 29.338 V15.0.0 (Sep. 2017), 50 pages.
M. Foster et al. "Number Portability in the Global Switched Telephone Network (GSTN): An Overview" Network Working Group, Request for Comments: 3482, Feb. 2003, 30 pages.
J. Yu "Number Portability Parameters for the "tel" URI" Network Working Group, Request for Comments: 4694, Oct. 2006, 15 pages.
S. Bradner et al. "The E. 164 to Uniform Resource Identifiers (URI) Dynamic Delegation Discovery System (DDDS) Application (ENUM)" Internet Engineering Task Force (IETF), Request for Comments: 6116, Mar. 2011, 22 pages.
B. Hoeneisen et al. "IANA Registration of Enumservices: Guide, Template, and IANA Considerations" Internet Engineering Task Force (IETF), Request for Comments: 6117, Mar. 2011, 40 pages.
B. Hoeneisen et al. "Update of Legacy IANA Registrations of Enumservices" Internet Engineering Task Force (IETF), Request for Comments: 6118, Mar. 2011, 68 pages.
3GPP "3rd Generation Partnership Project; Technical Specification Group Core Network and Terminals; Mobile Application Part (MAP) specification (Release 15)" 3GPP TS 29.002 V15.3.1 (Oct. 2018), 1021 pages.
Sonera, Nokia, Comverse, "Addressing in MMS," 3GPP TSG-T2 #12, T2-010247, Los Angeles, California, USA, Feb. 12-16, 2001, 33 pages.

* cited by examiner

METHOD, AND NODES, FOR DISCOVERING SERVICES IN A TELECOMMUNICATION NETWORK PROVIDED BY A NETWORK FUNCTION, NF, IN A SERVICE BASED ARCHITECTURE, SBA, BASED TELECOMMUNICATION NETWORK

CROSS REFERENCE TO RELATED APPLICATION(S)

This application is a 35 U.S.C. § 371 National Phase Entry Application from PCT/EP/2018/083379, filed Dec. 3, 2018, designating the United States, and also claims the benefit of European Application No. 18382757.5, filed Oct. 25, 2018, the disclosures of which are incorporated herein by reference in their entirety.

FIELD OF THE INVENTION

The present disclosure generally relates to the field of Service Based Architecture, SBA, based telecommunication networks and, more specifically, to methods and devices for improving the service discovery process.

BACKGROUND

The Fifth Generation, 5G, telecommunications system is under standardization by the Third Generation Partnership Project, 3GPP. A disruptive change is already agreed wherein traditional peer-to-peer interfaces and protocols are modified by a so-called Service Based Architecture, SBA, comprising a plurality of Network Functions, NFs, where each NF provides one or multiple services as a producer to one or multiple consumers, by means of a protocol that is under evaluation in 3GPP stage 3.

For each NF, services have been defined. For example, for the User Data Management, UDM, NF the following services are defined:
  UE Context Management, wherein the basic functionality is to allow a consumer NF to be registered as the serving NF for a particular User Equipment, UE.
  Subscriber Data Management, whose basic functionality is to allow a consumer NF to access to subscription data for a particular UE.
  Authentication, wherein the basic functionality is to allow a consumer NF to get UE authentication data.

The Network Repository Function, NRF, is a NF within the 5GC SBA Framework that provides support to service producers to register their services, so that service consumers can dynamically discover them. The service discovery function enabled by NRF provides the address of the NF instances that exist in a network for providing a service and all necessary information to issue and route requests towards the selected target NF producer, i.e. scheme, port, FQDN and/or IP address of target NF instance amongst other parameters required to create a URI used in the HTTP request.

Some telecommunication services, like voice, SMS, instant messaging, etc., normally require routing of signaling messages based on a public identifier like MSISDN, SIP URI, tel URI, GPSI, of the receiving subscriber.

The Generic Public Subscription Identifier, GPSI, is defined as a public identifier for addressing a subscription in 5GS. It is stored within the subscription data, i.e. provisioned in UDM/UDR, and associated with the corresponding Subscription Permanent Identifier, SUPI. The GPSI is currently either an MSISDN or an External Identifier, as defined in TS 23.003.

The routing of most of the procedures defined in 5GS are based on SUPI or Public Land Mobile Network, PLMN, Identification, ID, like the MCC/MNC. During the discovery procedure of the available instances of target NF service producers, the NRF provides to the NF service consumer all necessary information to create a URI to be used in the HTTP request of the required service. In the case of roaming, the NRF in the VPLMN identifies the HPLMN based on the HPLMN information included in the SUPI, e.g. MNC/MCC or the IMSI, and discovery requests are routed to the NRF in the HPLMN of the user. The NRF in the HPLMN provides necessary information for the NF consumer in the VPLMN to send the service request directly to the NF service producer in the HPLMN.

However, the inventors have found there is no routing mechanism defined in 5GS for procedures involving service-based operations that require routing based on GPSI as public identifier.

This may especially needed when the receiving subscriber identified by the GPSI belongs to a different PLMN, e.g. when a user A in PLMN A is trying to send a Short Message to a user B in PLMN B and having only the MSISDN of the user B as address, but it could be applicable also for subscribers that belong to the same PLMN.

The need for a new routing mechanism for GPSI in 5GC has been identified for the MO/MT SMS use cases that are described below, but it may be applicable to any potential use case requiring routing based on GPSI in 5GS.

In the current architecture service-based interfaces for SMS over NAS delivery are used within the Control Plane, more specifically between AMF and SMSF for MO/MT SMS transport, and between SMSF and UDM for managing SMS registration and subscription data.

There is no service-based interface defined for MO/MT SMS between central SMS functions, i.e. SMS-GMSC/IWMSC, IP-SM-GW/SMS Router, and UDM or SMSF. Hence, any network entity must use one of the existing protocols for SMS delivery when interacting with UDM and SMSF, which are MAP and Diameter, and both can use MSISDN as address.

The interactions between SMS-GMSC/IWMSC and UDM/HSS/HLR are used to retrieve routing information for the transfer of a Short Message, SM, report the delivery status of a SM (success or failure), and alert the SMS-SC that a UE is reachable after a failed delivery attempt.

These interactions are accomplished exchanging the corresponding messages that are routed based on routing requirements and methods defined for C interface using MAP or S6c interface using Diameter.

For MT SMS delivery use case in 5GS, the SMS-GMSC located in the HPLMN of subscriber A, i.e. the sender of the SM, may need to interact with UDM located in the HPLMN of subscriber B, i.e. the receiver of the SM, to retrieve the routing information, i.e. the SMSF address where subscriber B is registered, needed for routing the SM to the serving SMSF.

For MO SMS delivery use case in 5GS, the SMS-IWMSC located in the HPLMN of subscriber A (the sender of the SM) may optionally interact with UDM located in the HPLMN of subscriber B (the receiver/recipient of the SM), to retrieve the recipient's IMSI in order to check for the existence of an SMS interworking agreement between the two networks before proceeding with the MO SMS procedure addressing the SMS-SC.

When using MAP, in both MO and MT cases the information is requested using the sendRoutingInfoForSM operation. The message from SMS-GMSC/IWMSC to UDM is routed at SCCP level based on the MSISDN of subscriber B (as defined in TS 29.002). The E.164 format of the MSISDN (including the Country Code (CC) and the National Destination Code (NDC)) provides the needed information to route the message through the SS7 network to the target PLMN. There are solutions in place to ensure correct routing also in case of number portability.

When using Diameter, an equivalent operation is performed using the Send Routing Info for SM Request command. The SMS-GMSC or an intermediate Diameter node in the routing path implements methods to obtain the MCC/MNC of the PLMN of subscriber B (as defined in TS 29.338), e.g. obtaining the MCC/MNC of the PLMN associated to the CC and NDC codes of the MSISDN and building the MCC/MNC based network domain as described in subclause 19.2 of TS 23.003 to perform routing based on destination realm.

If a service-based interface is defined between SMS-GMSC and UDM, the routing principles used with MAP or Diameter protocols cannot be applied. Subscriber A will send a SM to subscriber B using the GPSI as recipient's identity. The GPSI in 5GS can be either an MSISDN or an External Identifier. Based on service discovery mechanisms in SBA, specially discovery across PLMNs, the GPSI does not include enough routing information to identify the target PLMN. Additionally, Number Portability aspects need to be also considered.

Hence for retrieval of routing information for SMS handling, a new routing mechanism has to be defined if service-based interactions using HTTP/REST protocol is introduced between central SMS functions and UDM.

As stated before, the need for a new routing mechanism can be applicable to other use cases requiring routing based on GPSI in 5GS.

Reference made to the disclosure "3rd Generation Partnership Project; Technical Specification group Services and System Aspects; Security; Lawful 20 Interception (LI) Architecture and Functions (Release 15)", 3GPP DRAFT; S31180550 DTS 22_127 V0_0_7 EDITORIALS, 3RD GENERATION PARTNERSHIP PROJECT (3GPP), MOBILE COMPETENCE CENTRE; 650; ROUTE DES LUCIOLES; F-06921 SOPHIA-ANTIPOLIS CEDEX; FRANCE, 24 Oct. 2018 (2018 Oct. 24), XP051486433.

SUMMARY

It is an object of the present disclosure to overcome the drawback as mentioned above.

In a first aspect, there is provided a method for discovering services in a telecommunication network provided by a network function, NF, in a Service Based Architecture, SBA, based telecommunication network.

The method comprising the steps of:
receiving, by a Network Repository Function, NRF, comprised by said telecommunication network, a discovery request, from a Network function, NF, consumer, for discovering an NF producer to interact with, wherein said discovery request comprises a Mobile Station International Subscriber Directory Number, MSISDN, associated with said NF consumer;
transmitting, by said NRF, to an address translate server, an address translate query, wherein said address translate query comprises said MSISDN;
receiving, by said NRF, an address translate response, wherein said address translate response comprises a Universal Resource Identifier, URI;
transmitting, by said NRF, to said NF, a discovery response, wherein said discovery response comprises an NF producer instance for interaction with said NF.

The above described method is directed to a routing mechanism based on MSISDN when it is used as Generic Public Subscription Identifier, GPSI, in and between 5GS networks where the system architecture is following the principles of a Service Based Architecture.

The description of the solution is illustrated using the same example described previously for MO/MT SMS delivery in 5GS, i.e. a routing mechanism for the SMS-GMSC/IWMSC, acting as NF service consumer, to retrieve routing information from UDM in the target PLMN, acting as NF service producer, when service-based interface based on HTTP protocol is used between central SMS functions and UDM.

To enable an architecture for SMS over NAS delivery in 5GC which allows UDM and SMSF to only use SBA services and to avoid supporting MAP or Diameter legacy protocols, it is proposed to introduce service-based interfaces for the interactions between central SMS nodes, i.e. SMS-GMSC/IWMSC, SMS Router/IP-SM-GW, and UDM or SMSF. It is also desirable to minimize the interworking needs between UDM and HSS/HLR.

Alternative 1

Since the NF service consumer, e.g. SMS-GMSC/IWMSC, supports the SBA framework and is able to consume NF services provided by the NF service producer, e.g. UDM, it may perform NF/NF service discovery in the same PLMN invoking a local NRF in this PLMN based on the MSISDN of a subscriber B, which is the known recipient's identity.

According to this alternative proposed by the present disclosure, the local NRF may perform the following actions:

1. The local NRF, also named hereafter NRF A, may check if the MSISDN belongs to its own PLMN, i.e. PLMN A. Different options are possible for performing this check:
  a. The local NRF finds an NF service producer instance, e.g. a UDM instance, that has registered previously to serve this MSISDN. This may require NF service producer instances to register in NRF including the MSISDNs they serve.
  b. The local NRF may keep information of the MSISDN ranges or list of individual MSISDNs served by its PLMN, configured or provisioned in NRF. This information may need to be updated every time an MSISDN is added/removed to the list/ranges of SUPIs managed by the PLMN also considering Number Portability scenarios.
  c. Otherwise, when MSISDN is used as GPSI, the local NRF may perform an ENUM query. If there is a record for the MSISDN in the DNS/ENUM server, the result of the ENUM query may contain a URI that would indicate the local NRF that the MSISDN belongs to its own PLMN. The URI could be an HTTP URI that identifies the local NRF, hence indicating that the MSISDN corresponds to a 5G enabled user and SBI procedures can be applied for further interactions. For this purpose, a new Enumservice type/subtype may be registered in IANA to be used in ENUM for 5GC/SBA related services. Reusing an existing Enumservice type/subtype could also be considered. According to the ENUM response and based on parameters included in the service discovery request, i.e. service name, target NF type, the local NRF searches for NF service producers that can serve the request within its own PLMN.

If the MSISDN corresponds to a non-5G user, i.e. 2G/3G/ 4G only, the URI could be the MSISDN in tel URI format, using the existing Enumservice type/subtype "pstn/tel", indicating the routing applied for the procedure should not be based on SBI interactions, but legacy protocols, SS7, Diameter, etc. This may prevent the local NRF from searching for NF service producers, and will provide a service discovery error response indicating to the NF service consumer to use non-SBI interaction for the next operation request in the procedure 2. If the local NRF determines that the MSISDN does not belong to its own PLMN, this disclosure proposes that the local NRF may perform an ENUM query. This can be the same ENUM query that the local NRF may perform to determine if the MSISDN belongs to its PLMN as described in 1.c above.

In this case two scenarios with different behaviours may be distinguished: national interconnection scenario where MSISDN belongs to a national PLMN in the same country and international interconnection scenario where MSISDN belongs to a remote/foreign PLMN.

a. If a record associated to the MSISDN is not found in the ENUM server, a Number Portability, NP, query is performed to determine the PLMN subscriber B belongs to, i.e. PLMN B. This may imply that ENUM server is configured to query NP for national MSISDN ranges or number series. The answer from NP may include a Routing Number, RN, assigned to the network operator owning that specific MSISDN, based on IETF RFC 4694 and the technical specifications provided by local telecommunications regulation in each country.

The ENUM server may provide in the answer to the local NRF a tel URI including the RN as a parameter. Based on local configuration, the local NRF may then map the RN to a particular PLMN ID.

The local NRF may check whether there is an interconnection agreement with the target PLMN based on SBI. If this the case, the local NRF may send an inter-PLMN service discovery request to an NRF located in the target PLMN, using a configured URI of the remote NRF. The inter-PLMN service discovery response from the remote NRF in the target PLMN may indicate to the local NRF the NF service consumer to address the service operation request to, and the local NRF may forward the response to the NF service consumer.

Otherwise, i.e. there is no interconnection agreement based on SBI, the local NRF may issue a service discovery error response indicating to the NF service consumer to use a non-SBI interaction.

b. In case the MSISDN belongs to a foreign PLMN, the local NRF performs an ENUM query as well as for the national scenario. In this case the local NRF may know from the Country Code (CC) that it is not a national MSISDN and can send the query straight to the ENUM server instead of performing previous local checks.

The ENUM server can have a record provisioned for the CC number series pointing to the URI of a remote NRF in a foreign/transit PLMN with which there is an interconnection agreement, so that the local NRF is able to send an inter-PLMN service discovery request to that PLMN.

As a general case, the foreign/transit PLMN B can perform an NP query to determine the RN associated to the PLMN owning the MSISDN. The NRF in the PLMN B may map the RN to the MCC/MNC of PLMN C and may provide this PLMN ID of PLMN C to the NRF in PLMN A included in the inter-PLMN service discovery response.

At this point, the NRF in PLMN A may check whether there is an interconnection agreement based on SBI with PLMN C and answer according to the NF service consumer indicating the kind of interaction to be used for the next operation request.

As a specific case, the PLMN B could be the one owning the MSDIDN, so the service discovery procedure applied between PLMNs A and B would be the same as for the national interconnection as described previously.

Alternative 2

As another alternative, the NF service consumer may perform the ENUM query in the first place.

If the ENUM response indicates that the MSISDN belongs to the same PLMN, the NF service consumer may invoke a service discovery request to the local NRF to complete the procedure in the same PLMN.

Otherwise, if as a result of the ENUM query and subsequent Number Portability query the target PLMN is different, the NF service consumer may invoke service discovery to the local NRF indicating the target PLMN ID, which may trigger a service discovery procedure across PLMNs.

In this case, the intelligence of the routing mechanism and the corresponding application logic may be located in the NF service consumer instead of the NRF.

Finally, the NF service consumer may create a service request including a URI pointing to a resource related to the MSISDN in a target NF service producer able to serve such request, making use of the information about the NF service producer instances managing services for that specific MSISDN using any of the alternatives proposed above. The NF service consumer may send the request, which is routed over the HTTP infrastructure using standard methods based on the URI provided. Alternatively, the NF service consumer may send an operation towards the destination entity using legacy protocols if the answer from NRF indicates not to use SBI interactions.

The present disclosure has several advantages over any known prior art.

The solution enables routing between NFs based on MSISDN within a 5GS and between two 5GS networks. The latter is for, for example, interconnect. As example it has been illustrated with MT and MO SMS transport between PLMNs, but the solution is not limited to those use cases.

The present disclosure leverages on existing standard technologies and procedures such as DNS/ENUM and Number Portability which may be reused in 5G networks based on SBA.

The disclosure of using ENUM in NRF provides a centralized point in the network for determining the routing mechanism to be used by other NFs by means of service discovery before sending an operation request.

The decision on the method of interconnection, i.e. SBI or non-SBI, may be decided by the local NRF, in PLMN A, rather than relying on interconnection agreements between other PLMNs, e.g. between PLMNs B and C.

In an example, the method further comprises the step of:
  determining, by said NRF, that said NRF is not able to discover said NF producer instance based on said MSISDN based on local information,
  and wherein said step of transmitting said address translate query is triggered by said determining step.

According to this example, the NRF may store, locally, information that could aid the NRF in retrieving an NF producer for a particular MSISDN. As such, the NRF may first determine whether the NF producer instance may be discovered locally before continuing with the address translate query. In case the NRF is not able to discover the NF producer instance locally, the address translate query may be transmitted.

In a further example, the method further comprises the step of:
  determining, by said NRF, said NF producer instance located within a same Public Land Mobile Network, PLMN, as said NRF.

The NRF may receives a response from the address translate server, and may use the parameters in this response to search for NF service producer instances that can serve the request within its own PLMN. This prevents the NRF to contact other PLMNs.

In yet another example, the received URI comprises a Routing Number, RN, and wherein said method further comprises the step of:
  mapping said RN to a Public Land Mobile Network, PLMN, identification corresponding to a target PMLN for said discovery request;
  forwarding, by said NRF, to an NRF located in said target PLMN using said PLMN identification, said discovery request;
  receiving, by said NRF, from said NRF located in said target PMLN, a discovery response, wherein said discovery response comprises an NF producer instance in said target PLMN for interaction with said NF.

The above described example allows for a interconnection between PLMNs based on SBI.

In yet another example, the address translate server is a Domain Name Server, DNS, /ENUM server.

In a second aspect of the present disclosure, there is provided a Network Repository Function, NRF, arranged for discovering services in a telecommunication network provided by a network function, NF, in a Service Based Architecture, SBA, based telecommunication network, wherein said NRF comprises:
  receive equipment arranged for receiving a discovery request, from a Network function, NF, consumer, for discovering an NF producer to interact with, wherein said discovery request comprises a Mobile Station International Subscriber Directory Number, MSISDN, associated with said NF consumer;
  transmit equipment arranged for transmitting, to an address translate server, an address translate query, wherein said address translate query comprises said MSISDN;
  wherein said receive equipment is further arranged for receiving an address translate response, wherein said address translate response comprises a Universal Resource Identifier, URI, and
  wherein said transmit equipment is further arranged for transmitting, to said NF, a discovery response, wherein said discovery response comprises an NF producer instance for interaction with said NF.

The advantages of the first aspect of the disclosure being a method for discovering services in a telecommunication network, are also inherently a part of the second aspect of the disclosure. Furthermore, it is pointed out that although the claims read as if all the modules/equipments according to this second aspect of the present disclosure are incorporated into a single node, a person skilled in the art understands that the same disclosure could be implemented by, for example, distributing each of the modules over several nodes. Alternately, the disclosure could also be purely implemented in the cloud, whereby none of the physical nodes possess any of these modules/equipments as such.

In an example, the NRF further comprises:
  process equipment arranged for determining that said NRF is not able to discover said NF producer instance based on said MSISDN based on local information,
  and wherein said transmit equipment is further arranged for transmitting said address translate query triggered by said determining.

In another example, NRF comprises process equipment arranged for determining said NF producer instance located within a same Public Land Mobile Network, PLMN, as said NRF.

In yet another example, the received URI comprises a Routing Number, RN, and wherein said NRF further comprises:
  map equipment arranged for mapping said RN to a Public Land Mobile Network, PLMN, identification corresponding to a target PMLN for said discovery request;
  and wherein said transmit equipment is further arranged for forwarding, to an NRF located in said target PLMN using said PLMN identification, said discovery request;
  and wherein said receive equipment is further arranged for receiving, from said NRF located in said target PMLN, a discovery response, wherein said discovery response comprises an NF producer instance in said target PLMN for interaction with said NF.

In an example, the address translate server is a Domain Name Server, DNS, /ENUM server.

In a third aspect of the present disclosure, there is provided a telecommunication network having a Service Based Architecture, SBA, wherein said telecommunication network comprises a Network Repository Function, NRF, in accordance with any of the examples as provided above.

In a fourth aspect, there is provided a computer program product comprising a computer readable medium having instructions which, when executed by a Network Repository Function, NRF, causes said NRF to implement a method in accordance with any of the method examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
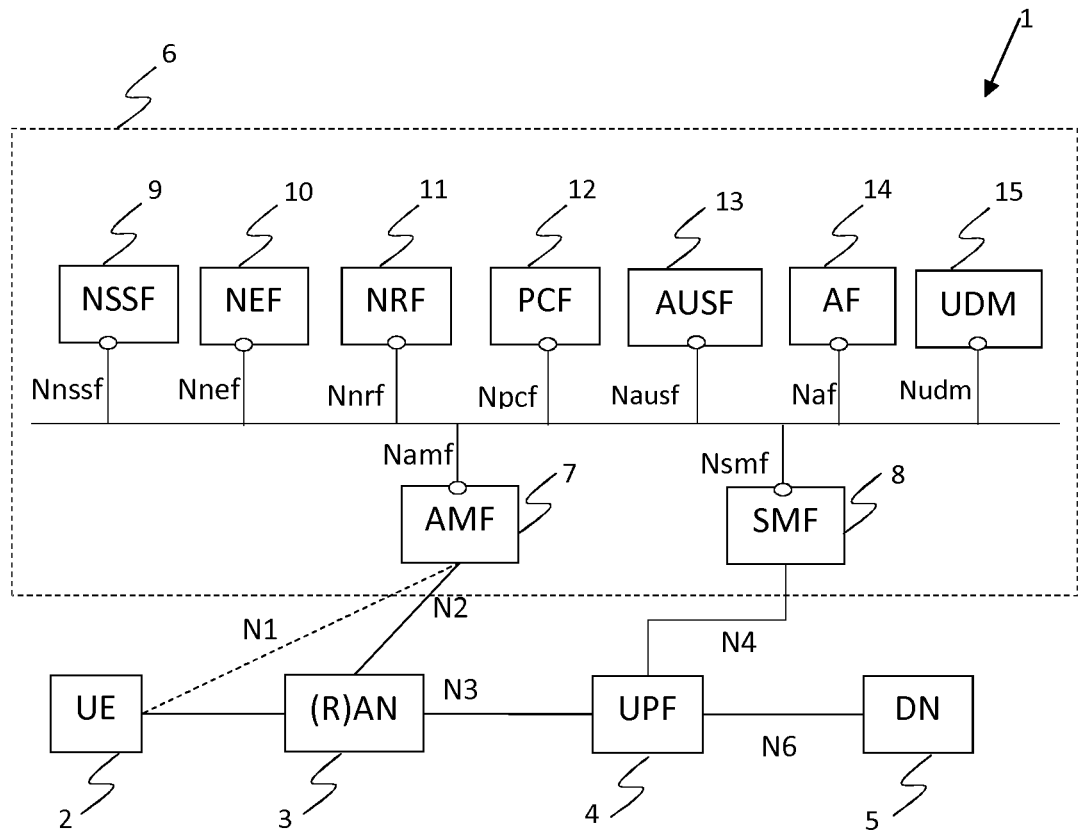
FIG. 1 discloses an example of a Fifth Generation, 5G, system architecture.

FIG. 1 schematically illustrates part of the reference architecture 1 of a fifth generation, 5G, Service Based Architecture, SBA, telecommunication network, according to the prior art. The 5G system architecture comprises the following Network Functions, NFs in the core network 6:

Network Slice Selection Function, NSSF, 9
Network Exposure Function, NEF, 10
Network Repository Function, NRF, 11
Policy Control Function, PCF, 12
Authentication Server Function, AUSF, 13
Application Function, AF, 14
Unified Data Management, UDM, 15
Access and Mobility Management Function, AMF, 7
Session Management Function, SMF, 8

The 5G system architecture may further comprise a User Equipment, UE, 2, a Radio Access network, RAN, 3, a User Plane Function, UPF, 4 and a Data Network, DN, 5.

A functional description of these network functions is specified in clause 6 of the Third Generation Partnership Project, 3GPP, standard 23.501, "System Architecture for the 5G system", the contents of which are included herein, by reference.

Figure 2:
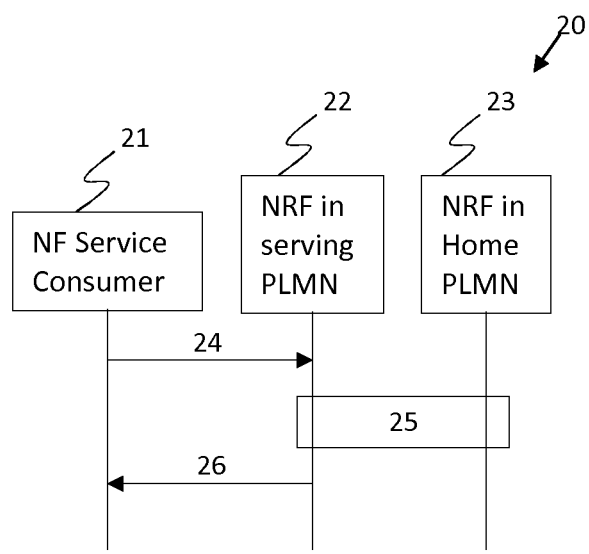
FIG. 2 discloses an example of an NF/NF service discovery across PLMNs.

FIG. 2 discloses an example of an NF/NF service discovery 20 across PLMNs.

In roaming situations, the information regarding an NF service producer in a PLMN different from the one where the NF service consumer sits, is gathered using the NRFs in the respective PLMNs as depicted in 2.

An NF service consumer 21 sends a discovery request towards the NRF in the serving PLMN 22. The NRF in the serving PLMN 22 will then communicate with the NRF in the home PLMN 23 of the service consumer 21 as indicated with reference numeral 25. Finally, the discovery response is sent 26, by the NRF in the serving PLMN 22 back to the NF service consumer 21.

Figure 3:
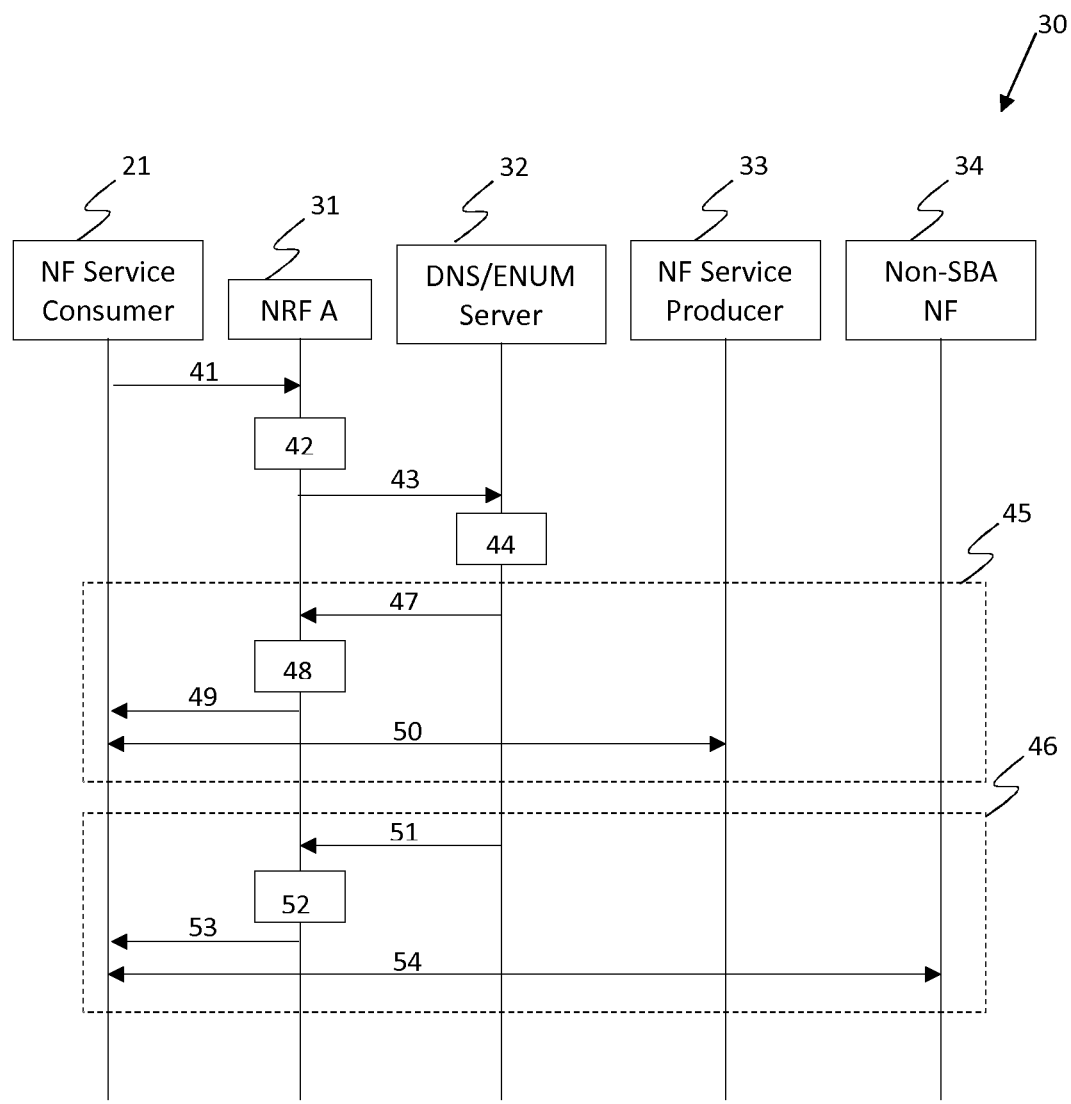
FIG. 3 discloses an example of a method for discovering services in a telecommunication network provided by a network function, NF.

FIG. 3 discloses an example of a method 30 for discovering services in a telecommunication network provided by a network function, NF.

The corresponding steps are discussed in more detail here below.

Reference 41. The NF service consumer 21, e.g. SMS-GMSC/IWMSC, that belongs to PLMN A, needs to consume services of an NF service producer, e.g. UDM, 33 that serves subscriber B whose MSISDN is a known identity, e.g. for SMS. For that purpose, the NF service consumer 21 may send an NF/NF service discovery request to the local NRF, i.e. NRF A, 31 within its own PLMN, including the MSISDN as input parameter, in order to discover NF service producer instances to interact with. The '+' character that appears at the beginning of the number can be used to distinguish E.164 numbers in international format from numbers in other format, for example dialed digit strings or other digit sequences.

Reference 42. NRF A 31 does not find 42 any instance of the NF service producer, e.g. UDM, 33 that has registered previously to serve this specific MSISDN, neither it is possible to find an instance based on local configuration/provisioning.

Reference 43. NRF A 31 sends an ENUM query to an address translate server, i.e. DNS/ENUM server 32, requesting NAPTR records in DNS, converting the MSISDN in E.164 format to an FQDN within the e164.arpa domain, as described in RFC 6116 for ENUM service.

Reference 44. The DNS/ENUM server 32 is provisioned with an NAPTR record corresponding to that specific MSISDN.

Reference 45. Own user 5G enabled and interworking based on SBI 47. If subscriber B is 5G enabled, i.e. there is a 5G subscription for this user which is allowed to access and be served by 5GS, the existing NAPTR record translates the E.164 number to the HTTP URI of NRF A, indicating that this is a 5G user belonging to the same PLMN and SBI procedures can be applied for further interactions.

The ENUM response may provide this NAPTR record, which can contain a new Enumservice type/subtype in the form "E2U+sba:http(s)" registered to be used in ENUM for 5GC/SBA related services, or an existing Enumservice.

Reference 48. According to the ENUM response and based on parameters received in the service discovery request in the step as indicated with reference numeral 41, i.e. service name, target NF type, NRF A may search for NF service producer instances that can serve the request within its own PLMN.

Reference 49. NRF A sends a service discovery response providing the NF service producer instance(s) that can serve the service request using SBI interactions.

Reference 50. From the service discovery response, the NF service consumer selects an NF service producer instance 33 and starts an SBI interaction for the corresponding NF service request.

Reference 46. Own user not 5G or non-SBI interworking, e.g. SS7, Diameter.

Reference 51. If subscriber B is not 5G enabled or it is not possible to use SBI interactions, the existing NAPTR record translates the E.164 number to a tel URI of subscriber B, indicating that SBI procedures cannot be applied for further routing.

The ENUM response provides this NAPTR record, which contains an existing Enumservice type/subtype in the form "E2U+pstn:tel" registered to be used in ENUM for telecommunications session over legacy protocols.

Reference 52. According to the ENUM response, NRF A may skip searching for NF service producer instances that can serve the request.

Reference 53. NRF A sends a service discovery error response indicating to the NF service consumer to use non-SBI interaction for the next operation request in the procedure.

Reference 54. According to the service discovery response, the NF service consumer issues an operation request using a legacy protocol such as SS7 or Diameter, e.g. MAP operation sendRoutingInfoForSM for SMS.

Figure 4:
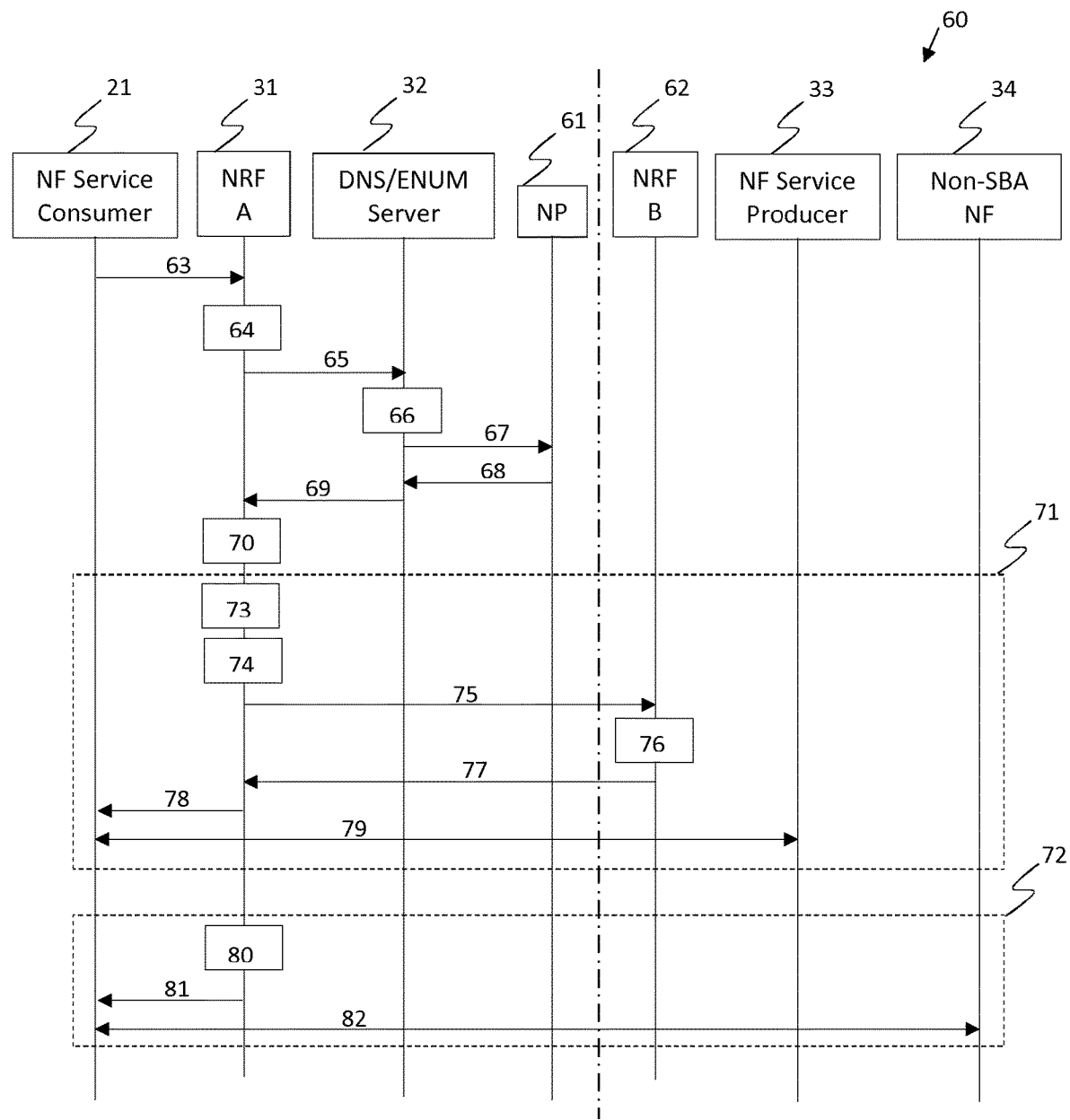
FIG. 4 discloses an example of another method for discovering services in a telecommunication network provided by an NF.
Figure 5:
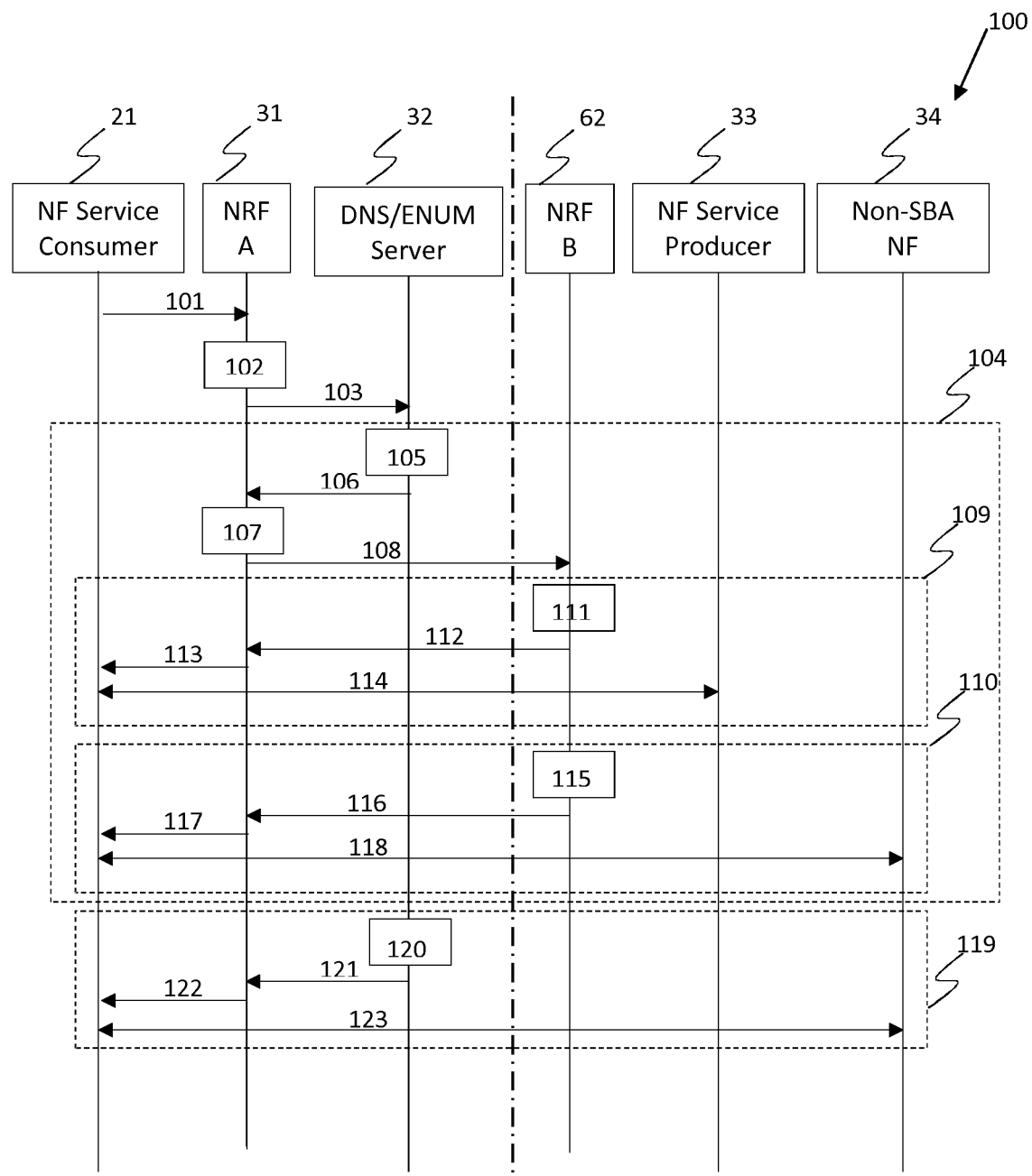

FIG. 4 discloses an example 60 of another method for discovering services in a telecommunication network provided by an NF.

The corresponding steps are discussed here below in more detail.

Reference 63. The NF service consumer, e.g. SMS-GMSC/IWMSC, that belongs to PLMN A, needs to consume services of an NF service producer, e.g. UDM, 33 that serves subscriber B whose MSISDN is the only known identity, e.g. for SMS. For that purpose, the NF service consumer sends an NF/NF service discovery request to the local NRF, i.e. NRF A, 31 within its own PLMN, including the MSISDN as input parameter, in order to discover NF service producer instances to interact with. The '+' character that appears at the beginning of the number can be used to distinguish E.164 numbers in international format from numbers in other format, i.e. dialed digit strings or other digit sequences.

Reference 64. NRF A does not find any instance of the NF service producer, e.g. UDM, that has registered previously to serve this specific MSISDN, neither it is possible to find an instance based on local configuration/provisioning.

Reference 65. NRF A sends an ENUM query requesting NAPTR records in DNS, converting the MSISDN in E.164 format to an FQDN within the e164.arpa domain, as described in RFC 6116 for ENUM service.

Reference 66. The DNS/ENUM server is not provisioned with an NAPTR record corresponding to that specific MSISDN.

The ENUM server is configured to make a Number Portability query for national MSISDN ranges or number series (i.e. MSISDNs belonging to the numbering plan used in the same country), to determine which is the PLMN/operator owning that specific MSISDN.

Reference 67. The NP query is performed to the NP function/service.

Reference 68. The answer from NP includes a RN assigned to the PLMN/operator owning that specific MSISDN (PLMN B), based on IETF RFC 4694 and the technical specifications provided by local telecommunications regulation in each country.

Reference 69. The ENUM server provides a tel URI in the answer to NRF A including the RN as a parameter. It is also included the "npdi" parameter to indicate that a NP query has already been made and prevent routing loops.

Reference 70. Based on local configuration, NRF A maps the RN to a (national) PLMN ID (MCC/MNC) corresponding to PLMN B.

Reference 71: Interconnection between PLMNs based on SBI.

Reference 73/74. According to local configuration, NRF A finds there is an interconnection agreement with PLMN B based on SBI. The URI of the NRF in the target PLMN (NRF B) is configured to be used for inter-PLMN NF/NF service discovery interactions between PLMN A and PLMN B.

Reference 75. NRF A sends an inter-PLMN service discovery request to NRF B. The request includes MSISDN and "npdi" as input parameters.

Reference 76. NRF B searches for NF service producer instances that can serve the request for that specific MSISDN within its own PLMN (PLMN B).

Reference 77. NRF B sends a service discovery response to NRF A providing the NF service producer instance(s) within PLMN B that can serve the service request using SBI interactions.

Reference 78. NRF A provides to the NF service consumer the information about NF (service) instances in PLMN B.

Reference 79. From the service discovery response, the NF service consumer selects an NF service producer instance in PLMN B and starts an SBI interaction for the corresponding NF service request.

Reference 72: Non-SBI interconnection between PLMNs (e.g. SS7, Diameter . . . )

Reference 80. According to local configuration, NRF A does not find an interconnection agreement with PLMN B based on SBI.

Reference 81. NRF A sends a service discovery error response indicating to the NF service consumer to use non-SBI interaction for the next operation request in the procedure.

Reference 82. According to the service discovery response, the NF service consumer issues an operation request using a legacy protocol such as SS7 or Diameter (e.g. MAP operation sendRoutingInfoForSM for SMS).

Other variations to the disclosed examples can be understood and effected by those skilled in the art in practicing the claimed disclosure, from a study of the drawings, the disclosure and the appended claims. In the claims, the word "comprising" does not exclude other elements or steps and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

A computer program may be stored/distributed on a suitable medium, such as optical storage medium or a solid-state medium supplied together with or as part of other hardware, but may also be distributed in other forms, such as via the Internet or other wired or wireless telecommunication systems. Any reference signs in the claims should not be construed as limiting scope thereof.

The present disclosure is not limited to the examples as disclosed above, and can be modified and enhanced by those skilled in the art beyond the scope of the present disclosure as disclosed in the appended claims without having to apply inventive skills.

The invention claimed is:

1. A method for discovering services in a telecommunication network provided by a network function, NF, in a Service Based Architecture, SBA, based telecommunication network, said method comprising the steps of:
   receiving, by a Network Repository Function, NRF, comprised by said telecommunication network, a discovery request, from a Network function, NF, consumer, for discovering an NF producer to interact with, wherein said discovery request comprises a Mobile Station International Subscriber Directory Number, MSISDN, associated with said NF consumer;
   transmitting, by said NRF, to an address translate server, an address translate query, wherein said address translate query comprises said MSISDN;
   receiving, by said NRF, an address translate response, wherein said address translate response comprises a Universal Resource Identifier, URI;
   searching, by said NRF, using said URI, an address of an NF producer instance for interaction with said NF consumer that can serve the discovery request within its own Public Land Mobile Network, PLMN; and
   transmitting, by said NRF, to said NF consumer, a discovery response, wherein said discovery response comprises said address of said NF producer instance.

2. The method in accordance with claim 1, wherein said method further comprises the step of:
   determining, by said NRF, that said NRF is not able to discover said NF producer instance based on said MSISDN based on local information,
   and wherein said step of transmitting said address translate query is triggered by said determining step.

3. The method in accordance with claim 2, wherein said method further comprises the step of:
   determining, by said NRF, said NF producer instance located within a same Public Land Mobile Network, PLMN.

4. The method in accordance claim 1, wherein said received URI comprises a Routing Number, RN, and wherein said method further comprises the steps of:
   mapping said RN to a Public Land Mobile Network, PLMN, identification corresponding to a target PMLN for said discovery request;
   forwarding, by said NRF, to an NRF located in said target PLMN using said PLMN identification, said discovery request; and
   receiving, by said NRF, from said NRF located in said target PMLN, a discovery response, wherein said discovery response comprises an NF producer instance in said target PLMN for interaction with said NF.

5. The method in accordance with claim 1, wherein said address translate server is a Domain Name Server, DNS, /ENUM server.

6. A Network Repository Function, NRF, arranged for discovering services in a telecommunication network provided by a network function, NF, in a Service Based Architecture, SBA, based telecommunication network, wherein said NRF comprises:
 receive equipment arranged for receiving a discovery request, from a Network function, NF, consumer, for discovering an NF producer to interact with, wherein said discovery request comprises a Mobile Station International Subscriber Directory Number, MSISDN, associated with said NF consumer;
 transmit equipment arranged for transmitting, to an address translate server, an address translate query, wherein said address translate query comprises said MSISDN;
 wherein said receive equipment is further arranged for receiving an address translate response, wherein said address translate response comprises a Universal Resource Identifier, URI, and
 searching, by said NRF, using said URI, an address of an NF producer instance for interaction with said NF consumer that can serve the discovery request within its own Public Land Mobile Network, PLMN; and
 wherein said transmit equipment is further arranged for transmitting, to said NF consumer, a discovery response, wherein said discovery response comprises said address of said NF producer instance.

7. The NRF in accordance with claim 6, wherein said NRF further comprises:
 process equipment arranged for determining that said NRF is not able to discover said NF producer instance based on said MSISDN based on local information, and wherein said transmit equipment is further arranged for transmitting said address translate query triggered by said determining.

8. The NRF in accordance with claim 6, wherein said NRF comprises process equipment arranged for determining said NF producer instance located within a same Public Land Mobile Network, PLMN.

9. The NRF in accordance with claim 6, wherein said received URI comprises a Routing Number, RN, and wherein said NRF further comprises:
 map equipment arranged for mapping said RN to a Public Land Mobile Network, PLMN, identification corresponding to a target PMLN for said discovery request;
 and wherein said transmit equipment is further arranged for forwarding, to an NRF located in said target PLMN using said PLMN identification, said discovery request;
 and wherein said receive equipment is further arranged for receiving, from said NRF located in said target PMLN, a discovery response, wherein said discovery response comprises an NF producer instance in said target PLMN for interaction with said NF consumer.

10. The NRF in accordance with claim 6, wherein said address translate server is a Domain Name Server, DNS, /ENUM server.

11. A telecommunication network having a Service Based Architecture, SBA, wherein said telecommunication network comprises a Network Repository Function, NRF, in accordance with claim 6.

12. A computer program product comprising a non-transitory computer readable medium having instructions which, when executed by a Network Repository Function, NRF, causes said NRF to implement a method in accordance with claim 1.

* * * * *